United States Patent [19]

Kosonocky et al.

[11] 3,863,065

[45] Jan. 28, 1975

[54] DYNAMIC CONTROL OF BLOOMING IN CHARGE COUPLED, IMAGE-SENSING ARRAYS

[75] Inventors: Walter Frank Kosonocky, Somerset; Brown F. Williams, Princeton, both of N.J.

[73] Assignee: RCA Corporation, New York, N.Y.

[22] Filed: Oct. 2, 1972

[21] Appl. No.: 293,829

[52] U.S. Cl. ................ 250/211 J, 250/578, 357/24, 357/30, 307/221 D

[51] Int. Cl. ........................................... H01l 15/00

[58] Field of Search ........... 250/220 M, 211 J, 578; 340/173 SS, 173 MA; 317/235 N; 307/311, 221 D; 357/30, 24

[56] References Cited

UNITED STATES PATENTS

| | | | |
|---|---|---|---|
| 3,423,527 | 1/1969 | Collins | 250/211 J |
| 3,435,138 | 3/1969 | Borkan | 250/211 J |
| 3,453,507 | 7/1969 | Archer | 250/220 M |
| 3,676,715 | 7/1972 | Brojdo | 307/307 |
| 3,704,376 | 11/1972 | Lehovec | 250/211 J |
| 3,771,149 | 11/1973 | Collins et al. | 340/173 |

OTHER PUBLICATIONS

"The New Concept . . . " by Altman Electronics, June 21, 1971, pages 50–59.

*Primary Examiner*—Harold A. Dixon
*Attorney, Agent, or Firm*—H. Christoffersen; S. Cohen

[57] ABSTRACT

Excess charge signal generated in response to optical overload of a charge-coupled sensing region is removed from that region by a bus imbedded in the substrate of the sensing array. The bus is separated from a row of sensing regions by a potential barrier produced by an electrode associated with the bus. This barrier is lower than that present, during the optical detection period, between adjacent sensing regions of a row and its value is affected by the voltages present on the conductors which pass over the bus and lead to the sensing regions.

10 Claims, 20 Drawing Figures

DYNAMIC CONTROL OF BLOOMING IN CHARGE COUPLED, IMAGE-SENSING ARRAYS

BACKGROUND OF THE INVENTION

When a photosensor array is illuminated by a scene in which certain regions are much, much brighter than others, problems are created, that is, the portions of the array receiving the intense radiation (which may be $10^5$ times the average scene intensity) become overloaded. In the case of a charge-coupled photosensor array, the intense radiant energy signal impinging on a particular location of the array results in the generation of much more charge signal than can be stored at that location. The excess charge tends to spread to the adjacent location or locations along the charge-coupled channel and may also spread to the adjacent charge-coupled channels and this spreading of charge manifests itself as "blooming" of the image which is read out of the array. In other words, the intense radiant energy source may appear, when read out and subsequentially reproduced, to occupy a much larger area than that occupied by the original.

SUMMARY OF THE INVENTION

Excess charge produced by radiant energy overload of an energy sensing location of a charge-coupled array is carried away by a bus imbedded in the substrate of the array. The bus is separated from a row of energy sensing locations by a potential barrier produced by an electrode associated with the bus. This barrier is lower than that present between adjacent locations of the channel during the integration time and its height is a function of the voltages present on conductors which pass over the bus and lead to the energy sensing locations.

DETAILED DESCRIPTION

Figure 1:
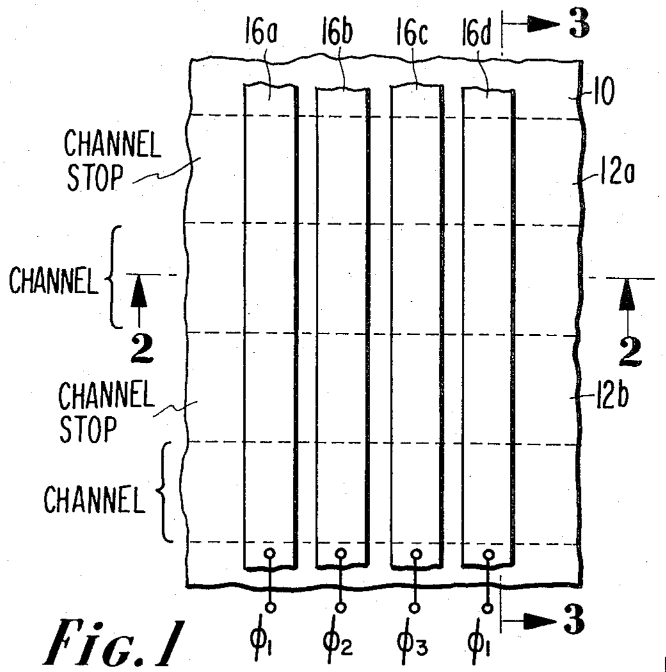
FIG. 1 is a plan view of a known charge-coupled image sensing array.

FIG. 1 illustrates a portion of a known image sensing array. Only some of the many storage locations, which may be present are shown. The temporary charge storage array which may be associated with the image sensing array is not shown nor are the sensing amplifiers and associated circuits shown, as they are not part of the present invention. These structures as well as a discussion of other aspects of image sensing arrays appear in a copending application for "Control of 'Blooming' in Charge-Coupled Image Sensing Arrays" by Walter F. Kosonocky and James E. Carnes, Ser. No. 287,860 filed on or about Sept. 11, 1972 and assigned to the same assignee as the present application.

Figure 2:
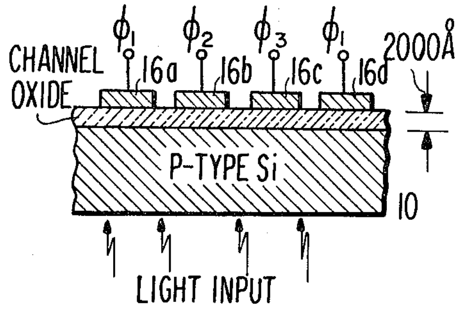
FIGS. 2 and 3 are sections of FIG. 1 taken along lines 22 and 33 respectively.
Figure 3:
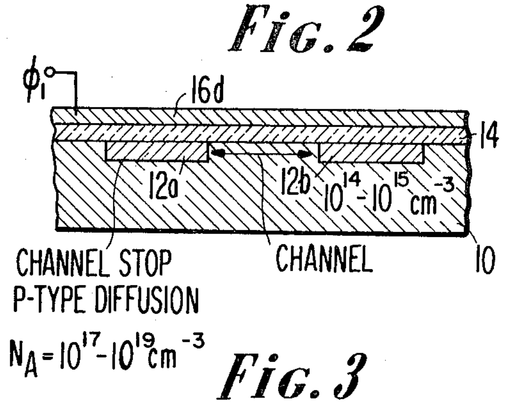

The array of FIGS. 1–3 includes a P type silicon substrate 10 which may have $N_A = {}^{14}$ to $10^{15}$ impurities per cubic centimeter. P type diffusions 12*a* and 12*b* are located at one surface of the substrate 10. These diffusions, which may be formed using ion implantation or other techniques, are more highly doped than the substrate and may contain, for example, $N_A = 10^{17}$ to $10^{19}$ impurities per cubic centimeter. The surface and diffusions are covered by an insulating layer 14 such as one formed of silicon dioxide ($SiO_2$). A plurality of charge conductors 16*a*, 16*b*, 16*c* and 16*d* are located on top of the insulation. These conductors function as charge storage electrodes at the spaced regions along their extent lying over the channel regions, as discussed in more detail shortly. A "charge storage location" consists of three adjacent such electrodes (for a three-phase system such as illustrated) over a single channel, as shown at 16*a*, 16*b*, 16*c* in FIG. 2. The portions of the conductors between corresponding electrodes in the different channels serve as conducting lines for carrying the multiple phase voltage to the respective charge storage electrodes. A very thin phosphorous-doped oxide layer (not shown) may be deposited over the entire structure for protection purposes.

The channel width in the structure above may be 0.6 mils; the channel stop diffusion 12*a*, 12*b* may be of the same width. The electrodes 16, which may be made of aluminum, may be 0.3 mils wide and spaced 0.1 mil apart. The oxide ($SiO_2$) thickness may be 2,500 A. These dimensions are given by way of example only.

Figure 5:
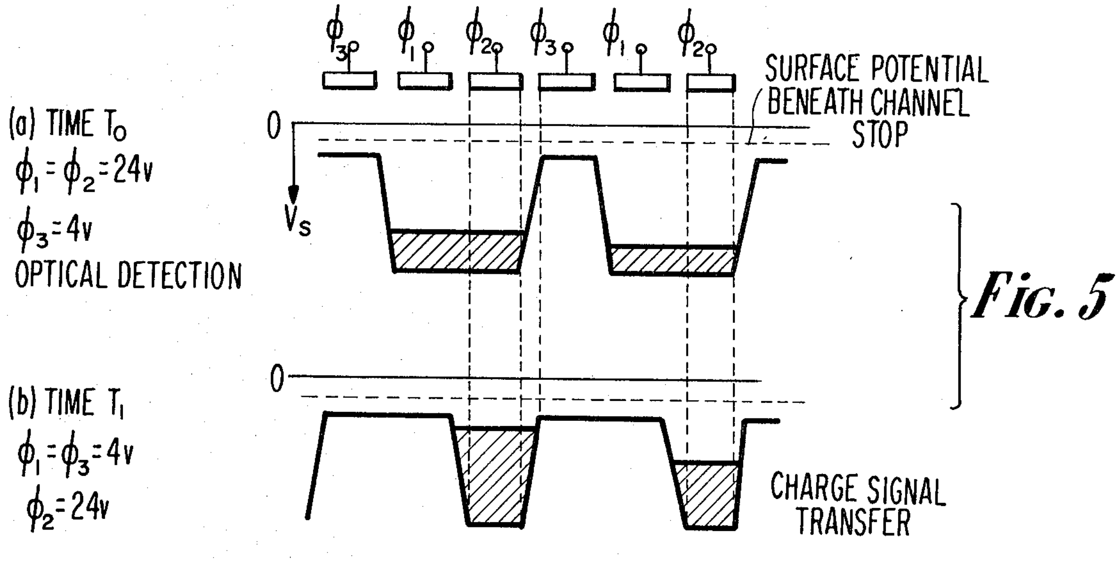
FIG. 5 shows the surface potential profiles taken along the channel in the arrangement of FIGS. 1–3.
Figure 6:
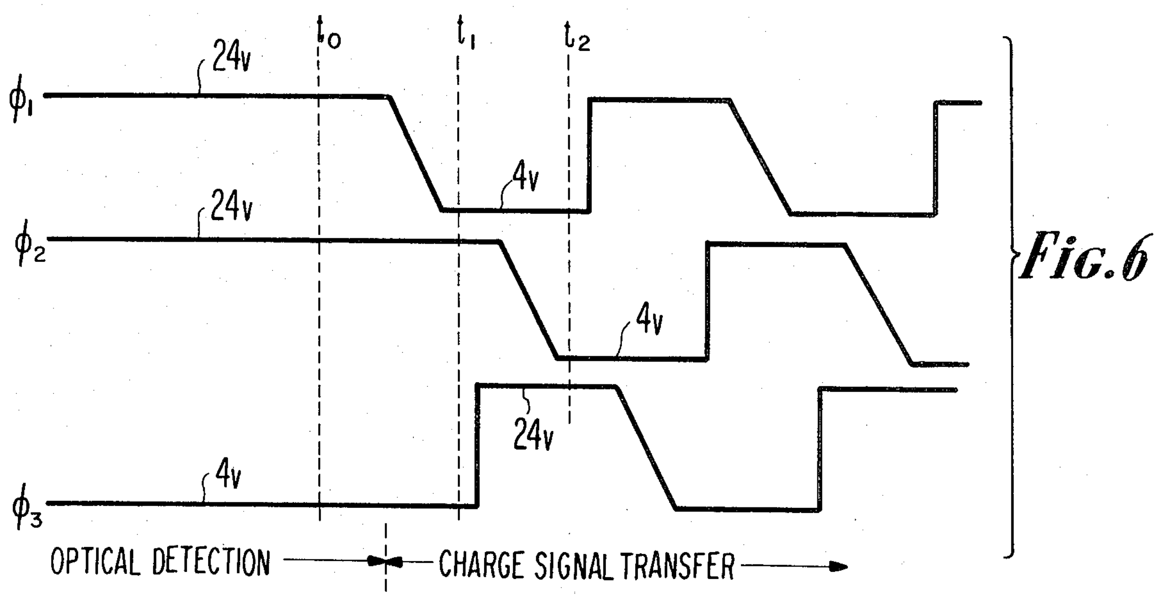
FIG. 6 is a drawing of waveforms employed in the operation of the arrangement of FIGS. 1–3.

The image sensing array just described may be operated in three phase fashion by employing the waveforms of FIG. 6. To start with, the electrodes 16*a* and 16*b* and all other electrodes (not shown) which are subsequently to be driven by the $\phi_1$ and $\phi_2$ alternating voltages are maintained at a fixed direct voltage level of 24 volts and electrode 16*c* and all other electrodes subsequently to be driven by the alternating voltage $\phi_3$ is maintained at a fixed direct voltage level of 4 volts. During the time these voltages are present, know as the "exposure" or "integration" time, a radiant energy image, such as an optical image, is projected onto the array either from the top or from the underside of the array. The charge carriers generated in response to this image accumulate in the potential wells beneath the electrodes maintained at +24 volts. These charge carriers are minority carriers (electrons in the case of a P type structure) and their accumulation as surface potentials is schematically illustrated in FIG. 5 at (*a*). The amount of charge accumulated beneath the $\phi_1$ and $\phi_2$ electrodes of each location such as electrodes 16*a* and 16*b* of FIG. 2 is proportional to the amount of radiant energy reaching that location.

Figure 4:
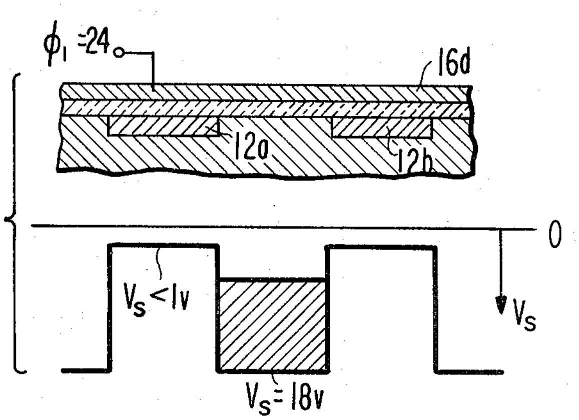
FIG. 4 shows the surface potential profile taken across the channel in the arrangement of FIGS. 1–3.

The P type diffusions, known as "channel stops," create potential barriers between adjacent channels as illustrated schematically in FIG. 4. Their purpose is to prevent the flow of charge from one channel to the next adjacent channel. The surface potential beneath a diffusion such as 12*a* may be a fraction of a volt whereas the surface potential at a charge storage location may be 18 volts or so when the electrode at that location is at a voltage of 24 volts. Because the impurity concentration of the P type diffusions is so high, the voltage of the conductors, such as 16*d*, which pass over the diffusions, cause substantially no depletion to occur and therefore have substantially no effect on the potential barriers.

After a sufficient number of charge carriers have accumulated, they are shifted out of the array by the alternating three phase voltage applied during the period legended "charge signal transfer" in FIG. 6. The surface potentials present at time $t_1$ are illustrated schematically in FIG. 5 at (*b*). Note that the charge formerly present under the $\phi_1$ and $\phi_2$ electrodes, has shifted entirely to the well beneath the $\phi_2$ electrode. During a following interval of time, $t_2$ in FIG. 6, the charge will have shifted to the well under the $\phi_3$ electrode and so on. The three phase voltages continue to be applied until all of the charge signal stored in the array has been shifted out of the array.

One of the problems associated with the array just described is radiant energy overloads. When an intense radiant energy source is imaged onto a charge storage location, the amount of charge generated at that location may be in excess of that which can be stored. Referring to surface potential profile *a* of FIG. 5, it is as if the amount of charge accumulated in a potential well overflowed that well. This excess charge is prevented from leaving the channel because the surface potential created by the channel stop, which is shown by dashed line and appropriately legended in FIG. 5, is lower than the surface potential between adjacent potential wells along the channel. Thus, any excess charge spills out of its potential well and into one or more adjacent potential wells in the same channel. This phenomenon, that is, the spreading of charge which results in the spreading of any intense image read out of the array, is known as "blooming."

Blooming also may occur in the arrangement of FIGS. 1–3 as a result of the way in which the voltages are manipulated. During the integration time, two electrodes of the three at each location are maintained at a relatively high voltage and provide a potential well which is relatively wide, as shown in FIG. 5. During the charge signal transfer time, the two wells collapse into one during the major portion of each transfer period. If during the integration time the wide potential well fills up with charge to more than half its capacity, a part of the charge will overflow when the wide well is replaced by a narrow well about half its width. The narrow wells are shown at (*b*) in FIG. 5.

Figure 7:
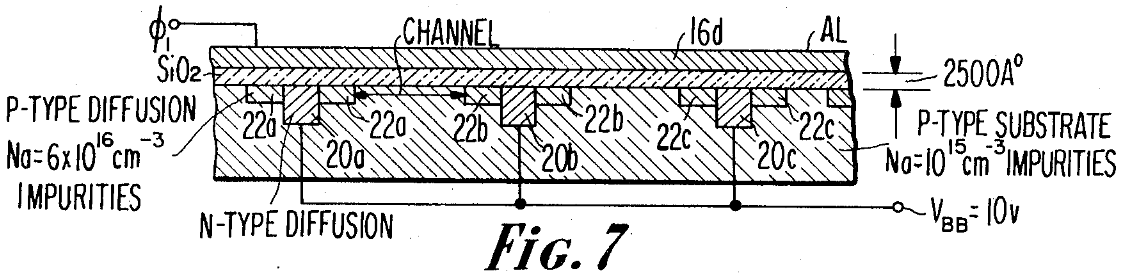
FIG. 7 is a section taken through one embodiment of the present invention.

FIG. 7 illustrates one solution according to the present invention of the problem discussed above. The structure of the array is the same of that of the one just discussed with two exceptions. First, an N type diffusion shown at 20*a*, 20*b* and 20*c*, is located at the center of each channel stop region. The channel stop region itself consists of two P type diffusions such as 22*a*, one on each side of the N type diffusion 20*a*. The P type diffusions are not as highly doped as in the prior art shown in FIGS. 1–3 but instead may have an impurity concentration Na of $6 \times 10^{16}$ impurities per cubic centimeter which preferably is introduced by ion-implantation techniques as these permit precise control of the doping level. At this doping level, the voltages present on the lines, such as 16*d*, which pass over the P type diffusions, affect the potential barrier produced by these diffusions. The N type diffusions 20 act as drains for electrons as they are maintained at some positive voltage level such as 10 volts.

Figure 8:
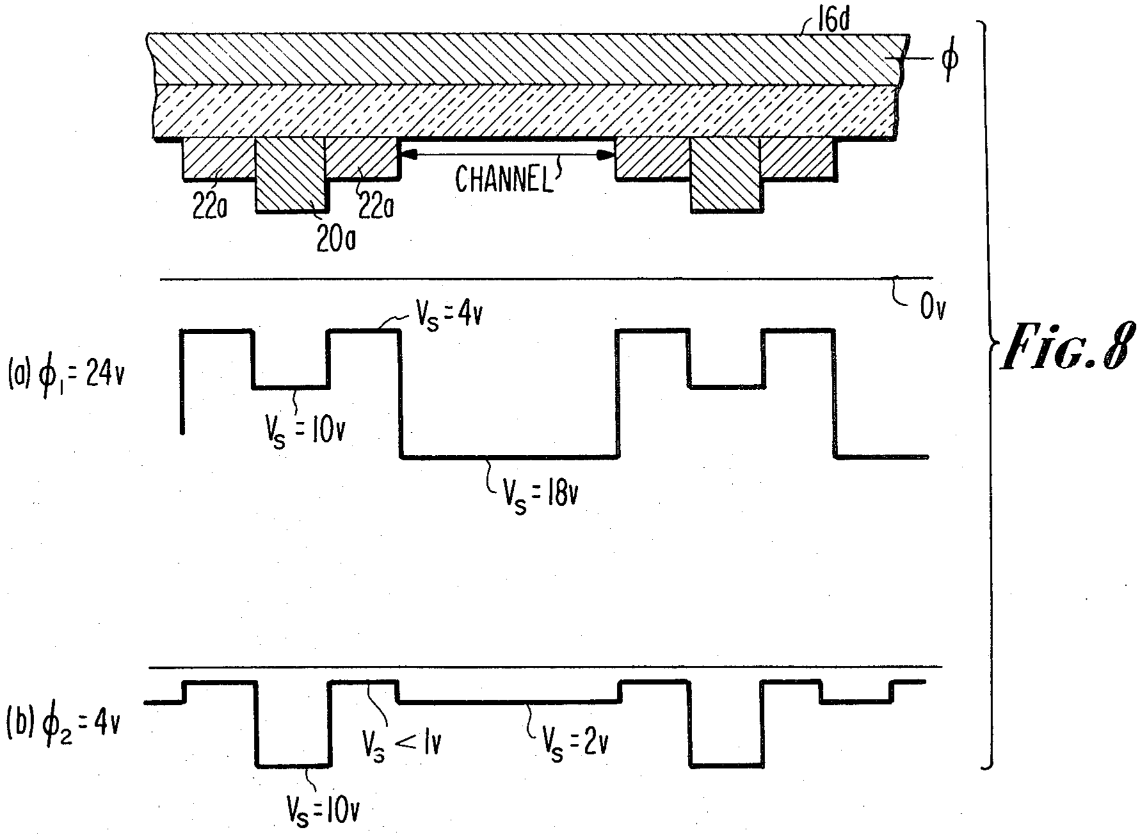
FIG. 8 shows surface potentials present across the channel in the arrangement of FIG. 7.
Figure 9:
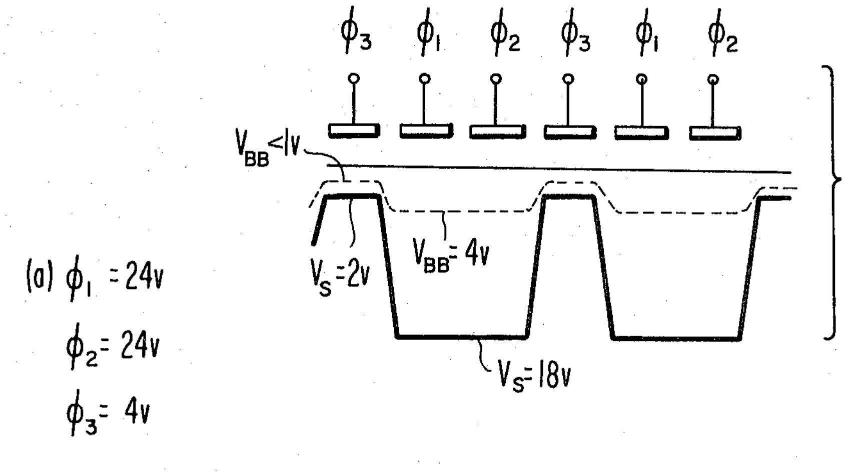
FIG. 9 shows the surface potentials present along the channel during the radiation detection time in the arrangement of FIG. 7.
Figure 10:
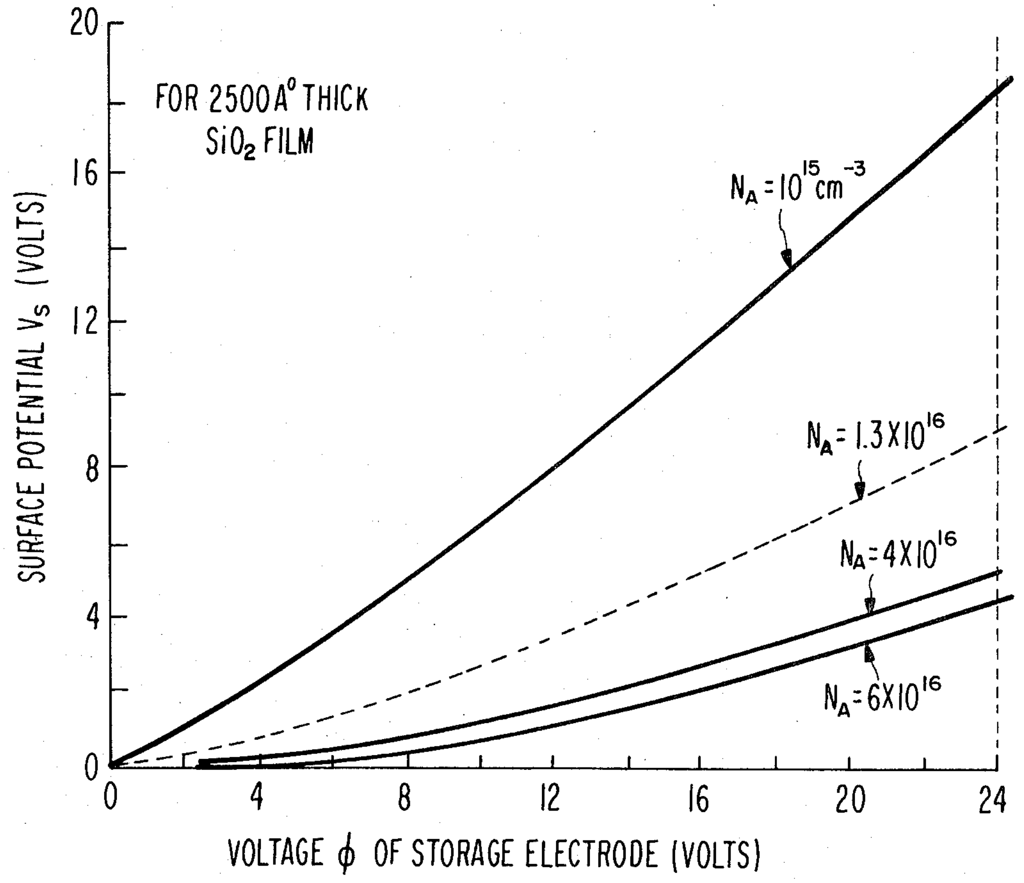
FIG. 10 is a graph of surface potential versus storage electrode potential in a charge-coupled structure, for different values of substrate doping.

The operation of the array is depicted in FIGS. 8 and 9. FIG. 9 shows the surface potential profile along the length of a channel during the optical integration time. Assuming a channel oxide layer 2,500 A. thick, the surface potentials present at various doping levels is that illustrated in FIG. 10. The surface potential beneath the electrodes at 24 volts is $V_S = 18$ volts and the surface potential present beneath the electrodes at 4 volts is $V_S = 2$ volts. The 2 volts, in effect, is a potential barrier between adjacent potential wells along the length of the channel. It can also be seen from FIGS. 8 and 10 that when a charge storage electrode 16*d* is at 24 volts, the surface potential beneath the diffusions 22*a*, for example, is 4 volts. This barrier is lower than the 2 volt barrier between potential wells along the length of the channel. Accordingly, if a radiant energy overload should occur and more charge carriers are generated than the potential well shown in FIGS. 9 and 8*a* can hold, then the excess charge will flow over the 4 volt potential barrier to the N type diffusion 20*a* in preference to flowing over the 2 volt barrier to the next adjacent potential well along the channel. The same holds for the case in which the wide wells of FIG. 9 become narrow wells as in FIG. 5*b*.

As mentioned above, the N type diffusions 20 are maintained at some positive voltage such as 10 volts. This 10 volts does not affect the P type diffusions 22 because it is a reverse bias relative to the PN junction between the P type diffusion 22 and the N type diffusion 20.

As may be observed from FIGS. 8 and 9, the potential barrier surrounding the N type diffusion is a dynamic barrier in the sense that its value varies with the voltages present on the line 16. When the voltage on line 16*d* is at 24 volts, for example, the barrier height is "lowest" (is most positive), only 4 volts. When the voltage present on line 16*d* is 4 volts, the barrier height increases (becomes less positive) to a value less than 1 volt. This is an important feature of the present invention as it insures that charge will not be lost from a channel as it is being propagated down the channel. In other words, were the potential barrier to remain constant at 4 volts, then during the charge propagation time when the voltage on the charge storage electrodes was being changed to cause the charge to propagate down the channel, a portion of this charge could conceivably be lost to the blooming bus 20 while the voltage of an electrode was decreasing to its relatively low value. The structure of FIG. 7 prevents blooming both during the integration time and the charge signal transfer time.

In the description of the operation of the embodiment of FIG. 7, the assumption is made that the diffusions 22 are sufficiently deep that they never become completely depleted. However, it is possible to operate such an arrangement with the blooming barrier diffusions 22 completely depleted at the highest value of the multiple phase voltages.

Figure 20:
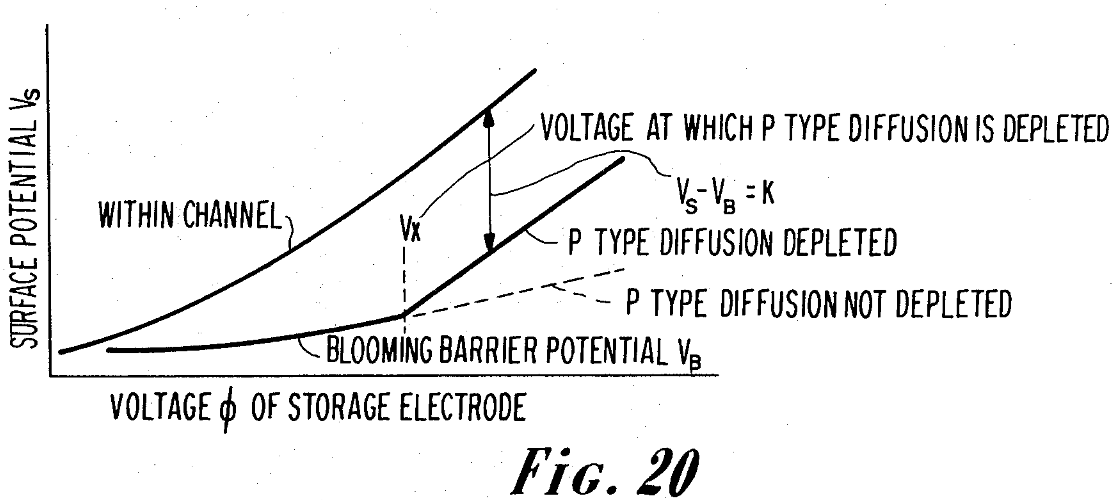
FIG. 20 is a graph to help explain the operation of a modified version of the embodiment of FIG. 7.

Operation in this way is depicted in FIG. 20. As can be seen from the lower graph, at storage electrode voltages greater than $V_X$ a diffusion 22 becomes completely depleted. When this occurs, the potential difference between the surface potential within the channel beneath the storage electrode at the relatively high voltage and the blooming barrier potential $V_B$ is a constant K. This means that the maximum charge which can be stored in that potential well is fixed and independent of the storage electrode potential.

An advantage of a charge-coupled image sensing array constructed in the way implied in FIG. 20 is that the blooming barrier diffusion may be implanted with a fixed dose of ions which determines the critical voltage value $V_X$ at which the blooming barrier diffusion is completely depleted.

The operation of such an array is relatively independent of the actual doping density of the diffusion and depends only on the total dose. In this case the impurity concentration $N_A$ may be limited to a number equal to or greater than $6 \times 10^{16}$ cm $^{-3}$ by the breakdown voltage between the blooming barrier diffusion and the $n+$ blooming buses.

Figure 11:
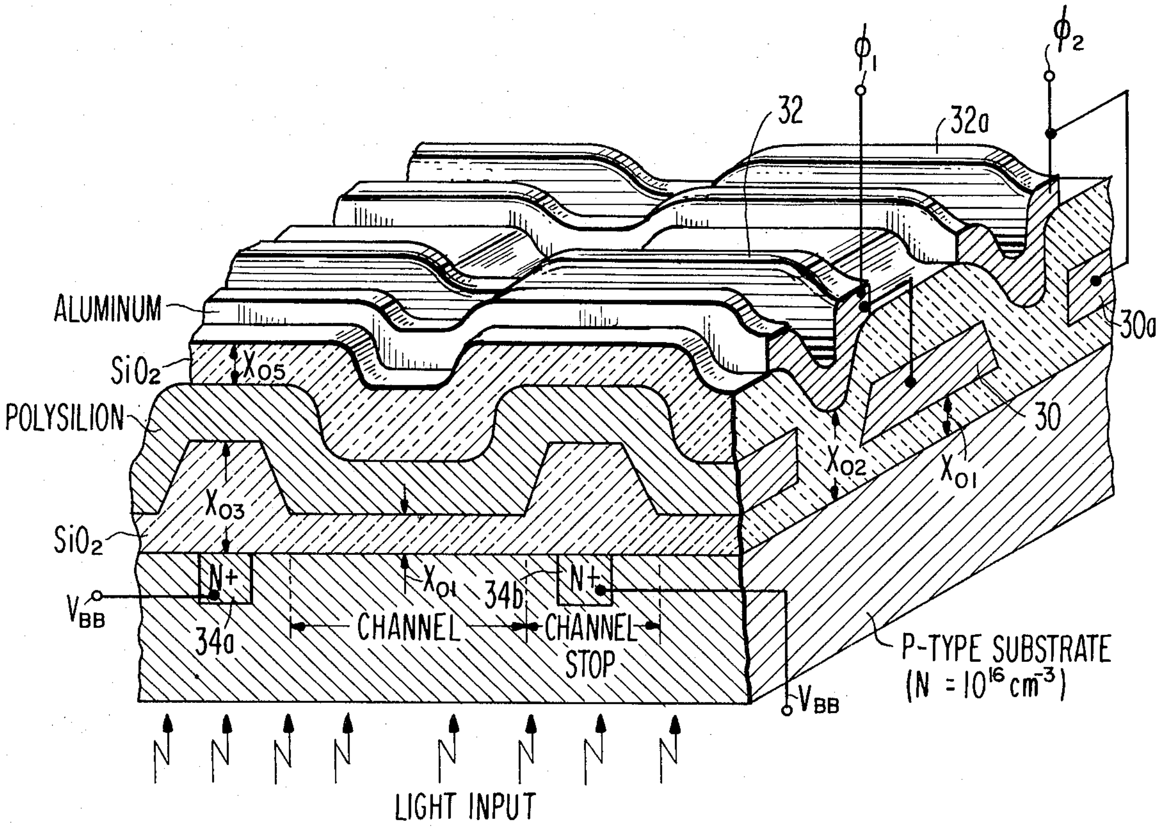
FIG. 11 is a broken-away, perspective view of a second embodiment of the invention.

FIG. 11 illustrates a second embodiment of the invention, this one suitable for two phase operation. The charge storage electrodes consist of electrode pairs. Each pair includes a polysilicon electrode such as 30 which is spaced relatively close to the substrate and an aluminum electrode, such as 32, which is spaced relatively further from the substrate. This pair of electrodes is driven by the same voltage phase, such as $\phi_1$, and forms an asymmetrical potential well in the substrate for the storage of charge. The adjacent electrode pair 30*a*, 32*a* is driven by $\phi_2$. The operation of such structures is discussed in detail in copending application Ser. No. 106,381 filed Jan. 14, 1971 for Charge Coupled Circuits by Walter F. Kosonocky, and assigned to the same assignee as the present application.

The difference between the structure of FIG. 11 and the structure of the copending application is that the FIG. 11 structure includes blooming buses such as 34*a*, 34*b* located in the substrate between the channels and also, in the FIG. 11 structure there must be careful control of the spacing between these buses and the polysilicon conductor. Each blooming bus lies beneath the portion of the electrode spaced furthest from the substrate. The buses act as drains for minority charge carriers and they are electrically isolated from the channels by potential barriers induced in the substrate by the electrodes which pass over the blooming buses.

There are two different versions of the FIG. 11 arrangement which are possible. In one, illustrated schematically in FIG. 15, the polysilicon electrode at its furthest distance $X_{03}$ from the substrate is further than the aluminum electrode at its closest space $X_{02}$ from the substrate. In the second version, (FIG. 16), the polysilicon electrode is spaced closer to the substrate, even at its furthest spacing $X_{03}$, than the aluminum electrode substrate. Typical dimensions are noted on these figures.

Figure 12:
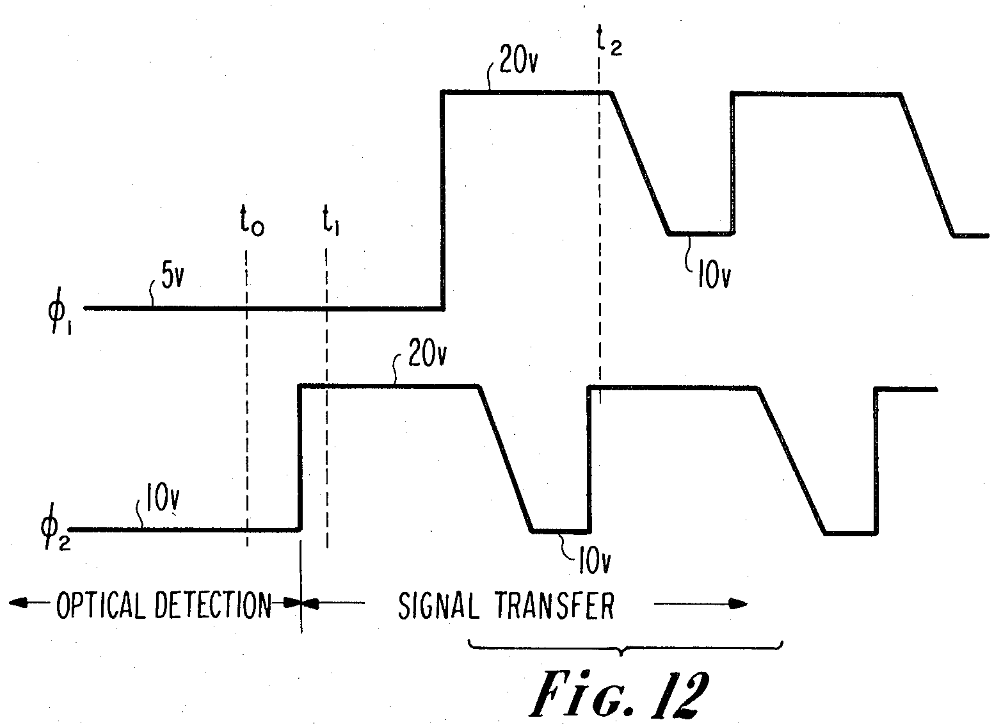
FIGS. 12 and 13 are drawings of waveforms employed in the operation of different versions of the embodiment of FIG. 11.
Figure 14:
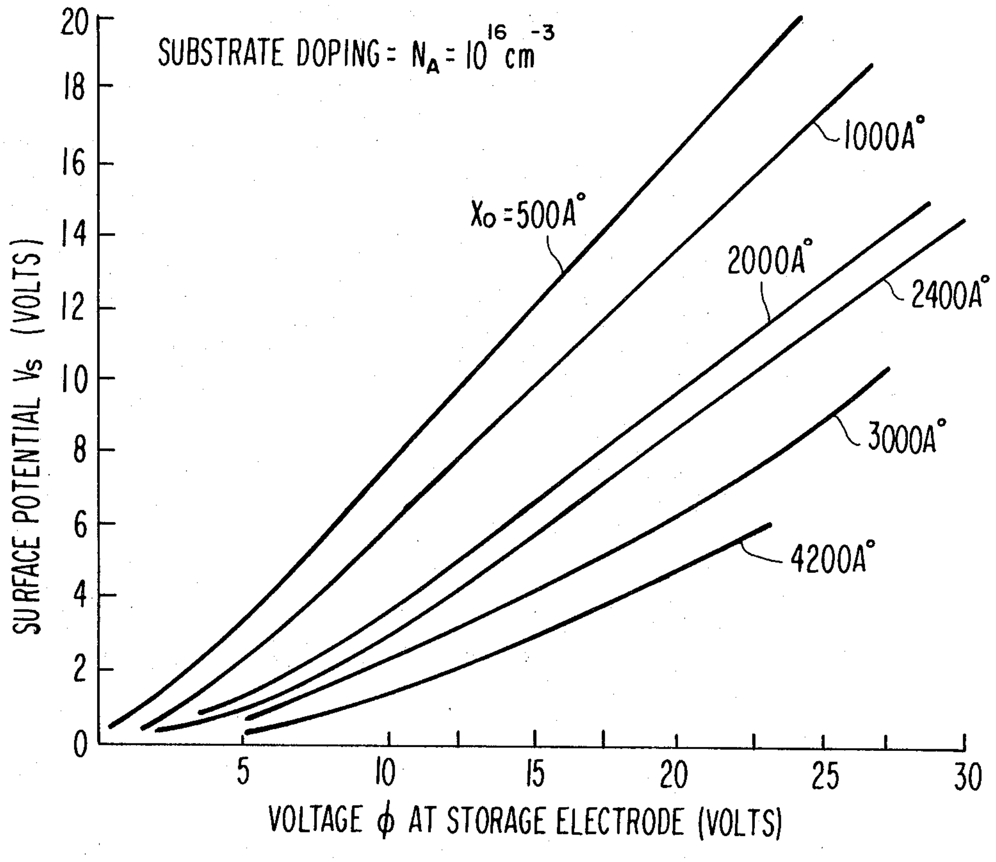
FIG. 14 is a graph of surface potential versus storage electrode voltage in a charge-coupled structure for different thicknesses of the channel oxide between the storage electrode conductor and the substrate.
Figure 17:
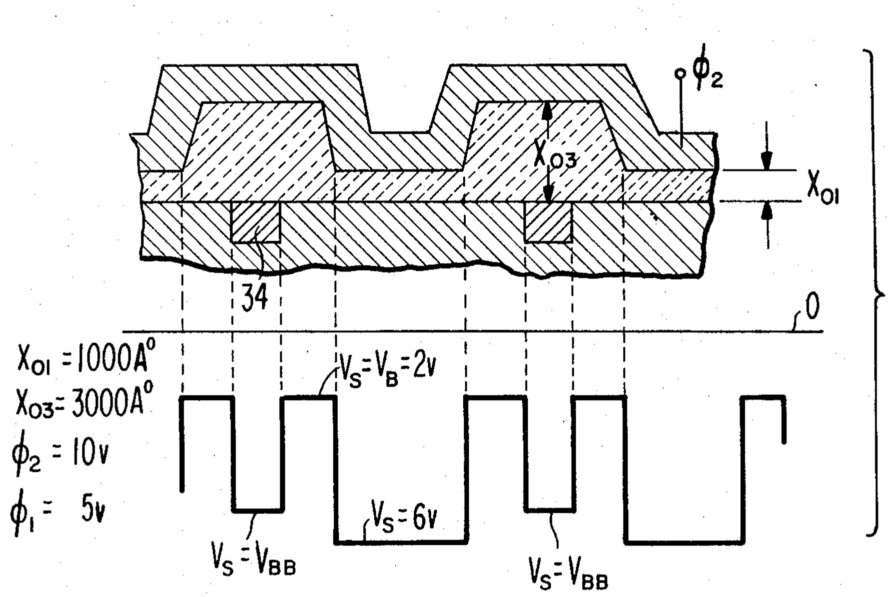
FIG. 17 shows the surface potential profile across the channel for the embodiment represented by FIG. 15.
Figure 18:
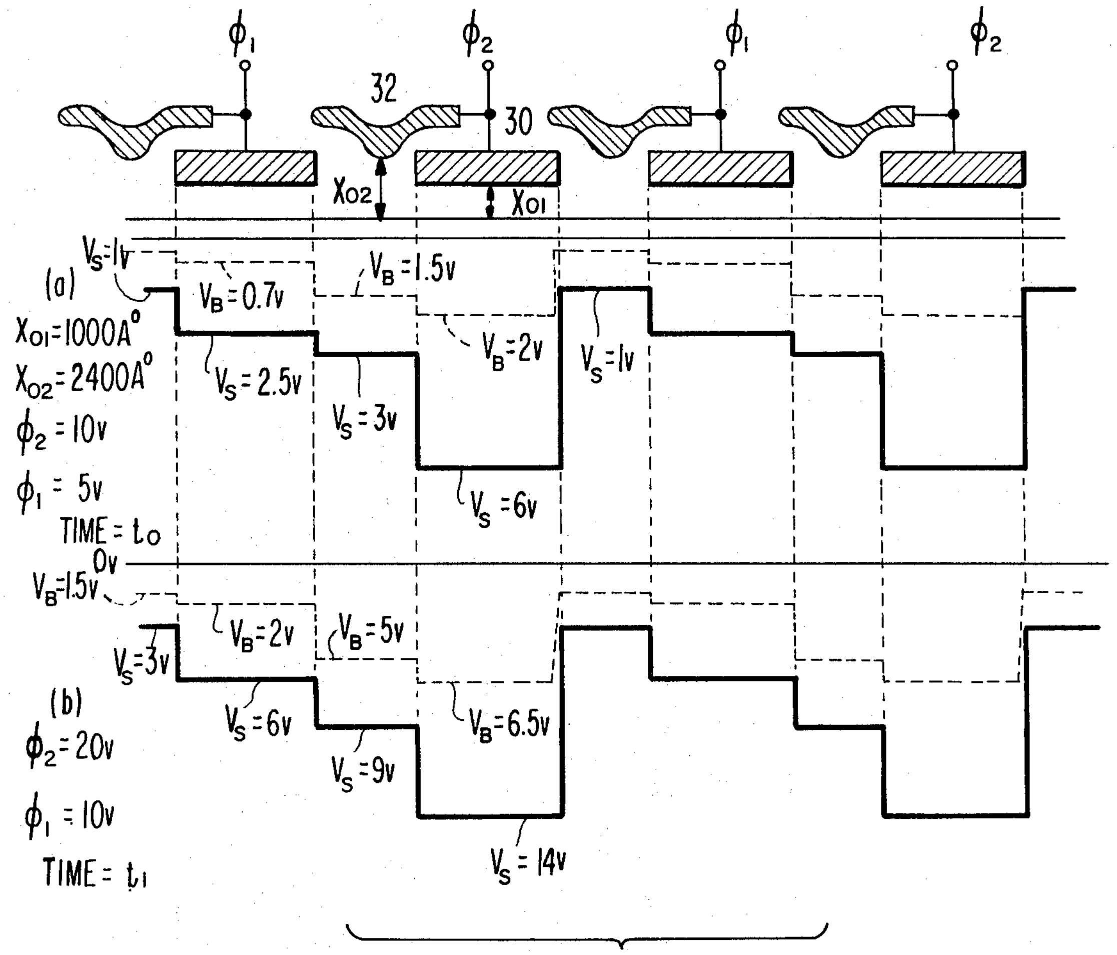
FIG. 18 shows surface potential profiles along the channel for the embodiment represented by FIG. 15.

The operation of the first version of the FIG. 11 structure is illustrated in FIGS. 17 and 18. The waveforms are shown in FIG. 12. During the optical integration time, the $\phi_1$ electrodes are maintained at 5 volts and the $\phi_2$ electrodes at 10 volts. The surface potential profile across a channel is shown in FIG. 17. The actual values of these surface potentials may be found in the graph of FIG. 14. Note that the potential barrier $V_B$, that is the surface potential immediately adjacent to the blooming bus 34, is 2 volts. The surface potential between adjacent storage locations along the length of a channel, shown in FIG. 18*a*, is 1 volt, which is higher than (less positive than) the blooming bus barrier potential. Thus, any accumulation of charge beneath $\phi_2$ electrode 30 which would tend to reduce the surface potential present beneath this electrode to less than 2 volts, will flow preferentially to the blooming bus 34 rather than to the adjacent storage location along the channel.

It may be observed in FIG. 18, that just as in the first embodiment of the invention discussed, the barrier potential isolating the blooming bus from the channels has a value dependent on that of the conductor passing over the bus. When the polysilicon conductor is at 10 volts, the blooming barrier potential is 2 volts. When the aluminum electrode 32 is at 10 volts, the blooming barrier surface potential is 1.5 volts. This difference in surface potential is due to the difference in spacings of the aluminum and polysilicon electrodes from the blooming bus 34. These and the other surface potentials shown, are taken from FIG. 14.

FIG. 18b illustrates the operation when the $\phi_2$ electrode is at 20 volts and the $\phi_1$ electrode is at 10 volts, during the charge signal transfer time. Note again that the barrier potentials are dynamic and are a function of the voltages present on the conductors passing over the blooming bus. The barrier potentials are also a function of the spacing between the conductors and the portion of the substrate containing the blooming buses 34.

Figure 13:
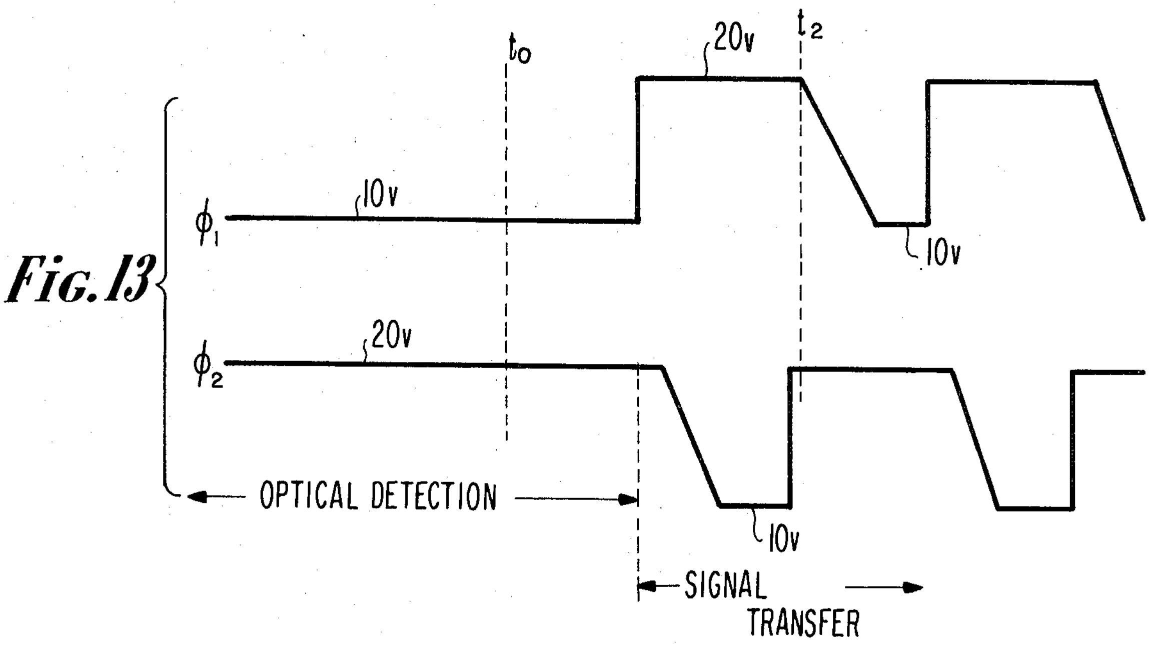
Figure 16:
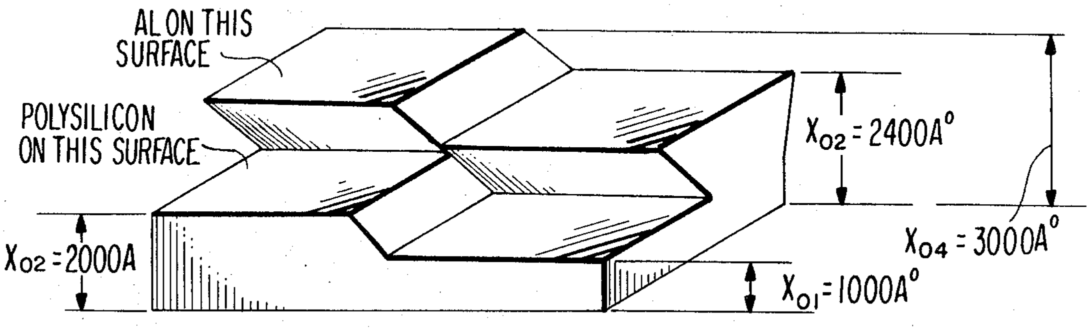

The embodiment of FIG. 16 may be operated with the voltages shown in FIG. 13. Because of the difference in dimensions shown, the voltages employed during the radiant energy detection interval, that is, during the integration time, may be different than in the FIG. 12 embodiment.

Figure 19:
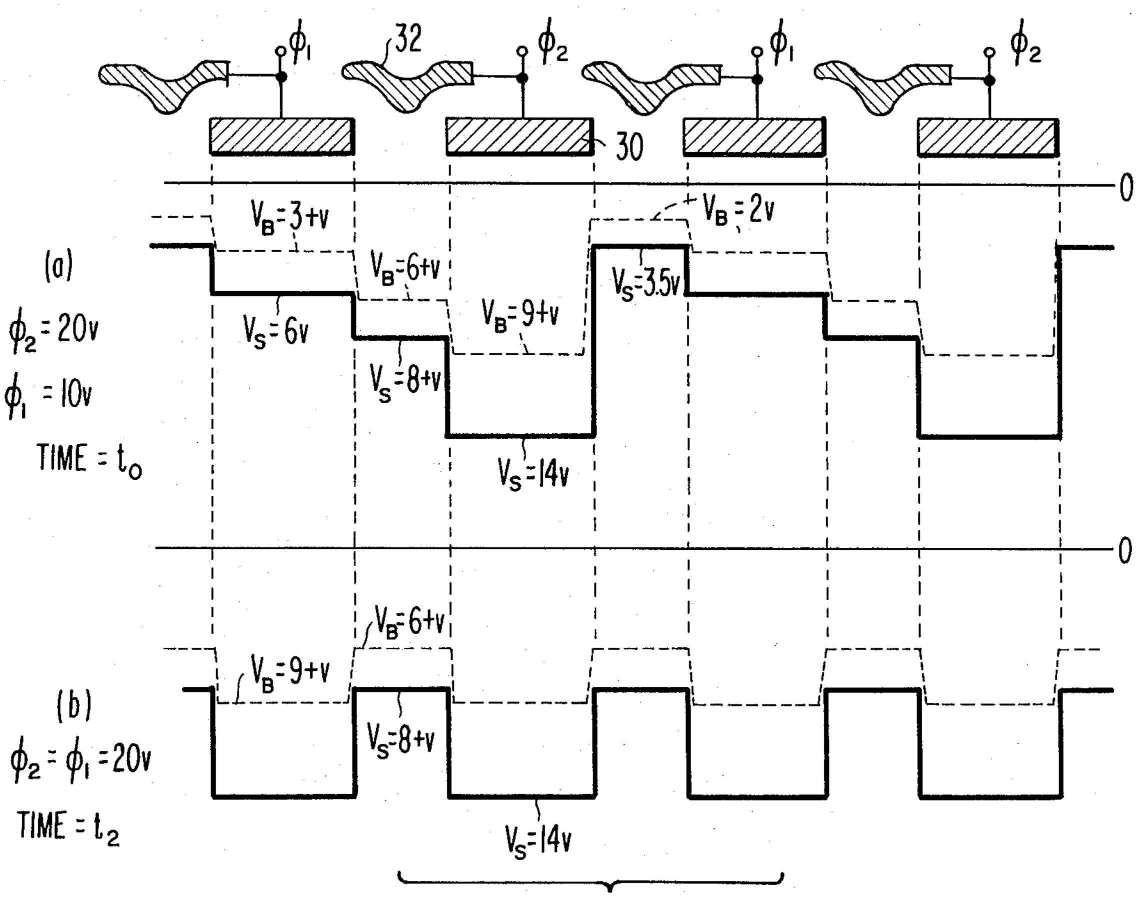
FIG. 19 shows surface potential profiles along the channel for the embodiment represented by FIG. 16.

The operation is depicted in FIG. 19. Note that during the integration time, the barrier potential $V_B$ adjacent to the polysilicon electrode 30 with the deepest potential well, is 9 + volts. The surface potential in the channel beneath the aluminum electrode 32 connected to that polysilicon electrode is 8 + volts. Thus, the barrier potential is lower than (is more positive than) the surface potential in the channel adjacent to the deep potential well. This means that during the integration time, the potential well cannot fill up with more than approximately 4 + volts (14 volts − 9 + volts) of charge signal in this example.

The arrangement just described protects against overloads both during the integration time and during the signal transfer time. During the time interval $t_2$ of FIG. 13, the surface potential profile is as shown in FIG. 19*b*. The barrier potential between adjacent charge storage locations along the channel is +8 volts. The blooming bus barrier potential is relatively lower and is at +9 volts. Thus, if during the charge signal propagation there is an overload and a potential well overflows, the excess charge will pass to the blooming bus in preference to passing to the next adjacent potential well in the channel.

Figure 15:
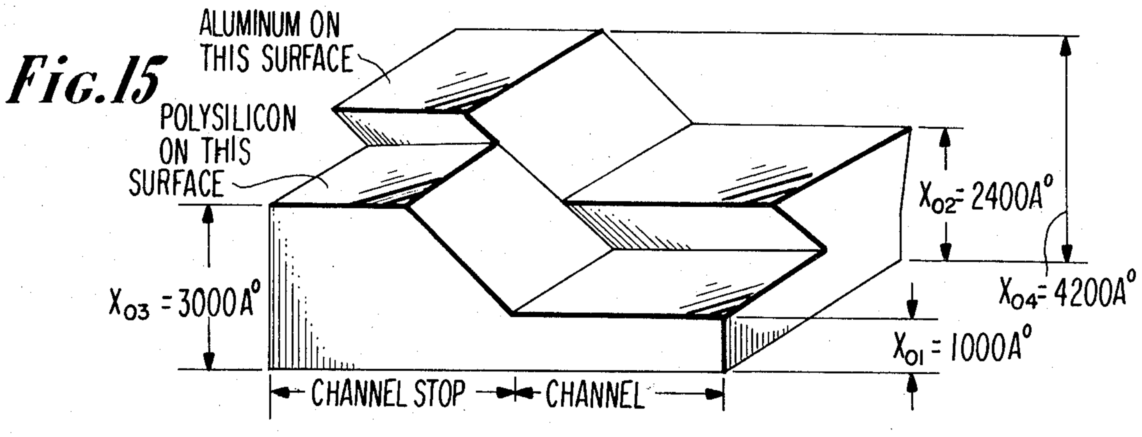
FIGS. 15 and 16 show the insulation thickness for two different versions of the embodiment of FIG. 11.

The embodiment of FIG. 15 protects against overloads only during the radiant energy detection of integration time. As can be seen in FIGS. 17 and 18, the barrier potential beneath the polysilicon electrode with the deepest well is higher than (less positive than) the surface potential in the channel beneath the aluminum electrode 32 of that pair. During the propagation time, at time interval $t_2$ of FIG. 12, the barrier potential next to the deep potential wells will be $V_B = 2$ volts and the surface potential between adjacent channels will be lower (more positive) $-V_S = 3$ volts. Therefore, if during the signal propagation time an overload should occur and a potential well overflow, the excess charge will go to the next adjacent potential well along the channel in preference to passing to the blooming bus 34.

The invention has been illustrated with substrates of P conductivity type. It is to be understood that N type substrates can be used instead with suitable changes in voltage polarities and employing P type blooming bus diffusions. It is also to be understood that the principles discussed herein are applicable not only to the two phase structures illustrated but to the other two phase structures discussed in the Kosonocky copending application identified above. It is also to be understood that the various materials mentioned herein are given by way of example only.

What is claimed is:

1. A charge-coupled, radiant-energy sensing array comprising, in combination:

a semiconductor substrate;

insulation over said substrate;

a plurality of rows of charge storage locations comprising, at each location, *n* electrode means, where *n* is an integer greater than 1, each electrode means spaced by said insulation from the substrate;

conductors joining corresponding electrode means in each row and passing over the regions of the substrate between rows;

means, during an integration time, for applying a voltage to the conductors leading to at least a first electrode means of each location in each row for establishing, in the substrate, beneath that first electrode means at each location, a potential well for the accumulation of charge signal in response to radiant energy excitation;

means, also during said integration time, for maintaining the conductors leading to a second electrode means of each location in each row at a potential for establishing, in the substrate, beneath that electrode means at each location, a potential barrier for tending to prevent the charge signal accumulated at each location in a row from passing to the next location in the same row;

a plurality of buses, each located between a pair of rows, and each extending along the length of the rows, each bus imbedded in the substrate and maintained at a potential to act as a drain for charge carriers, the conductors extending transverse to and passing over said buses; and means including either a channel stop of predetermined impurity or an insulator of predetermined thickness adjacent the buses responsive to the voltage applied to the conductors leading to the first electrode means for establishing in the substrate between the potential well beneath each said first electrode means and each bus, a potential barrier which is lower than the barrier beneath each second electrode means, whereby any charge signal in excess of that which can be stored in the substrate beneath a first electrode means preferentially flows over the lower barrier to a bus rather than to the potential well beneath the first electrode means in the next adjacent location in the same row.

2. In a charge-coupled array as set forth in claim 1, said bus comprising a diffusion in the substrate, of different conductivity than the substrate.

3. In a charge-coupled, radiant-energy sensing array which includes a semiconductor substrate, in combination:

two adjacent rows of charge storage locations, each location including a plurality of electrode means spaced by insulation from the substrate for accumulating charge signal at the substrate in response to radiant energy excitation;

a number of conductors equal to the number of electrode means in a row, each conductor connected to corresponding electrode means in both rows and spaced the same distance from the substrate as the electrode means, each conductor for applying a voltage to the electrode means to which it connects; and means for preventing excess charge signal at a location in one row from passing to an adjacent location of the same row or to a location in the next row comprising:

a bus imbedded in the substrate between the two rows and extending along the length of the rows, said bus comprising a diffusion in the substrate of different conductivity than the substrate;

means for maintaining the bus at a potential to act as a drain for charge signal; and two diffusions in the substrate of the same conductivity as the substrate and of higher impurity concentration than present in the substrate, each diffusion being located between a row and the bus and extending along the length of the bus, said conductors passing over said diffusions, and said diffusions being responsive to the voltages present at said conductors for creating a dynamic potential barrier at the surface of said substrate between each location in a row and the bus, at a level lower than that between that location and the next adjacent location in said row, and sufficiently high to permit charge signal in excess of that which can be stored at a location to flow over the barrier to the bus in preference to flowing to the next location in the row.

4. In a charge-coupled, radiant-enegry sensing array which includes a semiconductor substrate, in combination:

two adjacent rows of charge storage locations, each location including a plurality of electrode means spaced by insulation from the substrate for accumulating charge signal at the substrate in response to radiant energy excitation;

a number of conductors equal to the number of electrode means in a row, each conductor connected to corresponding electrode means in both rows and spaced by insulation substantially further from the substrate in the region between the rows than the electrode means to which it connects, each conductor for applying a voltage to the electrode means to which it connects; and means for preventing excess charge signal at a location in one row from passing to an adjacent location of the same row or to a location in the next row comprising:

a bus imbedded in the substrate between the two rows and extending along the length of the rows said bus comprising a diffusion in the substrate of different conductivity than the substrate;

means for maintaining the bus at a potential to act as a drain for charge signal; and means comprising the regions of the substrate between said bus and each row, extending along the length of the bus, said conductors passing over said regions, and said regions developing a surface potential dependent upon the voltages present on said conductors at the relatively further spacing of said conductors from said regions, said means for creating a dynamic potential barrier at the surface of said substrate between each location in a row and the bus, at a level lower than that between that location and the next adjacent location in said row, and sufficiently high to permit charge signal in excess of that which can be stored at a location to flow over the barrier to the bus in preference to flowing the next location in the row.

5. In a charge-coupled array as set forth in claim 4, each electrode means comprising a pair of electrodes the first closer to the substrate than the second, said pair for producing an asymmetrical potential well, and the number of conductors being equal to the number of electrodes.

6. In a charge-coupled array as set forth in claim 5, the second electrodes being spaced closer to the substrate than the spacing of the conductors, joining corresponding second electrodes, from the bus.

7. In a charge-coupled array as set forth in claim 5, the second electrodes being spaced further from the substrate than the spacing of the conductors, joining corresponding second electrodes, from the bus.

8. A radiant energy sensing system comprising, in combination:

a substrate comprising a semiconductor of given conductivity type;

insulation over said substrate;

a row of charge coupled storage locations comprising a plurality of spaced apart, substantially parallel electrode means, each electrode means spaced by said insulation from the substrate, each location comprising a group of $n$ such electrode means, where $n$ is an integer greater than 1;

a drain electrode formed in the substrate and extending parallel to and along the length of the row, said drain electrode formed of a semiconductor of opposite conductivity than the substrate and said drain electrode maintained at a potential to operate as a drain for charge carriers:

substrate for placing at least a first one of said electrode means at each location at a potential to form a depletion region in the sugstrate at each location for the accumulation of charge in response to radiant energy excitation;

means for placing a second one of said electrode means at each location at a potential to provide a potential barrier in the substrate at each location between the depletion region of that location and the depletion region of the adjacent location; and blooming control means including either a channel stop of predetermined impurity or an insulator of predetermined thickness adjacent said drain electrode responsive to the potential applied to each electrode means for creating in the substrate between each electrode means and said drain electrode a potential barrier of a height dependent upon the potential applied to said electrode means, and which, in the case of each first electrode means, is lower than the potential barrier created by the adjacent second electrode means, for permitting excess charge at any location to flow to said drain electrode.

9. A radiant energy sensing system as set forth in claim 8 wherein said channel stop of predetermined impurity comprises a bus in the substrate extending parallel to and along the length of the row; said bus located between said drain electrode and the row, said bus formed of a semiconductor material of the same conductivity type as the substrate but having a higher concentration of impurities than the substrate.

10. A radiant energy sensing system as set forth in claim 8 wherein said blooming control means comprises a region of the substrate extending along the length of said drain electrode and located between said drain electrode and said row, conductors leading to the electrode means at each location for applying voltages to said electrode means, said conductors being spaced by said insulation from the substrate, passing over said region of said substrate and extending transverse to the length dimension of said region, and wherein said insulator of predetermined thickness comprises insulation between said region of said substrate and said conductors which is substantially thicker than the insulation between said first electrode means and said substrate.

* * * * *